June 12, 1956  J. J. LENTZ  2,750,501
SECONDARY EMISSION TYPE TRIGGER CIRCUIT
Filed Dec. 21, 1951  2 Sheets-Sheet 1

INVENTOR
JOHN J. LENTZ
BY
Dwight D. Mooney
ATTORNEY

June 12, 1956   J. J. LENTZ   2,750,501
SECONDARY EMISSION TYPE TRIGGER CIRCUIT
Filed Dec. 21, 1951   2 Sheets-Sheet 2

INVENTOR
JOHN J. LENTZ
BY
Dwight D. Mooney
ATTORNEY

United States Patent Office 2,750,501
Patented June 12, 1956

2,750,501

SECONDARY EMISSION TYPE TRIGGER CIRCUIT

John J. Lentz, Chappaqua, N. Y., assignor to International Business Machines Corporation, New York, N. Y., a corporation of New York Application December 21, 1951, Serial No. 262,803

10 Claims. (Cl. 250—27)

This invention relates to trigger circuits and more particularly to a novel trigger circuit of the secondary emission type wherein a single secondary emission type tube is employed as a trigger circuit having two stable conditions alternately assumed.

In circuitry employing trigger circuits it is often desirable to use an input pulse of given polarity which when applied to a single input terminal will switch the trigger circuit from either stable condition to the other.

This implies that the response of the trigger circuit to one of a succession of identical input pulses applied at the single input terminal is determined by the stable condition of the trigger circuit just prior to the application of a given input pulse.

Accordingly, a principal object of the invention is to provide a novel trigger circuit of the secondary emission type having two stable conditions wherein an input pulse applied to a single input terminal effects a switching of the trigger circuit from either of its stable conditions to the other.

Another object is to provide a novel trigger circuit employing a single secondary emission type tube and voltage responsive circuit means connected between the secondary emission tube and the input to channel the effective path of an input pulse in response to the stable condition of the trigger circuit.

A further object is to provide a novel trigger circuit having two stable conditions employing a single secondary emission type tube and including circuit means responsive to an input pulse for applying that pulse directly to the secondary emission tube when the trigger circuit is in one stable condition and to the secondary emission tube through a grid controlled tube when the trigger circuit is in the other stable condition.

A still further object is to provide a novel trigger circuit having two stable conditions employing a single secondary emission tube and including a cathode follower responsive to the switching of the trigger circuit to only one stable condition to hold the output voltage at a predetermined value.

Other objects of the invention will be pointed out in the following description and claims and illustrated in the accompanying drawings, which disclose, by way of example, the principle of the invention and the best mode, which has been contemplated, of applying that principle.

Briefly, the invention includes a secondary emission type trigger circuit having two stable conditions alternately assumed. The secondary emission tube has a performance characteristic such that if its dynode voltage is increased to at least a certain predetermined value the tube will automatically seek a stable condition of conductivity referred to herein as the "up" condition. On the other hand if the dynode voltage is decreased to a value less than that certain predetermined value the tube will automatically seek another stable condition of minimum conductivity referred to herein as the "down" condition. A single input terminal is provided to receive positive pulses, to effect a switching of the trigger circuit from either stable condition to the other.

If the trigger circuit is in the "up" condition these pulses are applied through a switching circuit to a grid controlled tube having its plate connected to the dynode of the secondary emission tube. When this grid controlled tube is rendered plate current conductive the decreased voltage at its plate is applied to the dynode which voltage is then high because the trigger circuit is in the "up" condition and pulls the dynode voltage down below that certain predetermined value to effect a switching of the trigger circuit to the "down" condition.

If the trigger circuit is in the "down" condition these same input pulses are applied to the control grid of a cathode follower tube and to the dynode of the secondary emission tube. This pulse renders the cathode follower more conductive and increases the dynode voltage beyond that certain predetermined value to effect a switching of the trigger circuit to the "up" condition. The cathode of the cathode follower tube is conductively connected to the output terminal and the increased volage at the cathode due to the higher conductivity of the cathode follower tube holds the output voltage at a high value after the input pulse has ceased as long as the trigger circuit is in the "up" condition. However, when the trigger circuit has switched to the "down" condition the cathode follower tube is less conductive and the output voltage falls to a lower value when the input pulse ceases. Hence, an output indication is produced in response to each two input pulses, that is, no output is produced when the trigger circuit is switched from the "up" to the "down" condition.

Novel circuitry is connected between the input terminal and the cathode follower tube and the secondary emission tube and between the input terminal and the grid controlled tube to obtain selective circuit response in accordance with the stable condition of the trigger circuit to effect a switching of the trigger circuit from eiher stable condition to the other.

Figure 1:
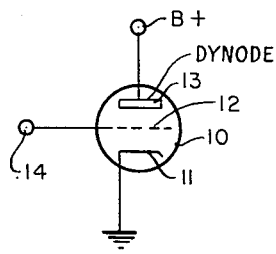
Fig. 1 is a diagrammatic sketch of a secondary emission type tube.
Figure 1A:
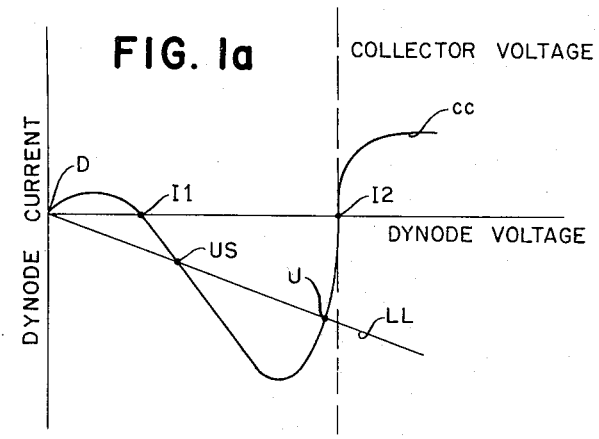
Fig. 1a shows a performance curve illustrating the operation of the tube of Fig. 1.

Referring more particularly to Figs. 1 and 1a there is shown in Fig. 1 a schematic representation of a tube 10 of the secondary emission type including a cathode 11, collector 12 and dynode 13, and in Fig. 1a there is shown the performance characteristic for the circuit of Fig. 1. This characteristic curve represents the change in the dynode current as the dynode voltage is varied, the collector being maintained at some constant positive voltage value.

Cathode 11 of tube 10 is connected to ground and the collector 12 is suitably connected to a source of constant positive voltage designated as 14. The dynode 13 is connected to a source of variable positive voltage designated B+. To obtain the characteristic curve CC the dynode-cathode voltage is varied (i. e., B+ varied) and the dynode current is measured. As the voltage on the dynode is increased from zero, electrons flow from the cathode to the dynode. This flow corresponds to the conventional current flow in an electron tube and is indicated by the initial portion of the curve above the abscissa. As the dynode voltage is further increased the electrons striking the dynode cause secondary electrons to be released and a corresponding decrease in the net electron flow to the dynode. Finally, the dynode current reaches zero at the point 11.

The particular material on the surface of the dynode determines the secondary emission actually obtained. The characteristic curve was obtained when a magnesium-silver alloy was employed.

As the dynode voltage is increased beyond the point 11 the number of secondary electrons exceeds the number of primary electrons travelling from the cathode to the dynode and the dynode current reverses its direction of flow. A further increase of the dynode voltage causes an increased number of secondary electrons to be emitted until the dynode voltage approaches the collector voltages. At this stage of operation space charge effects cause decreasing number of secondary electrons to reach the collector. Thus where the collector voltage and dynode voltage are substantially equal the primary and secondary electrons approaching and leaving the dynode respectively are substantially equal and the current flow is zero at the dynode. This point is designated as 12. A further increase of the dynode voltage, until it is more positive than the collector voltage, causes another reversal in the direction of the current flow. In such case the small initial velocities of the initial electrons is insufficient to overcome the retarding field between the dynode and cathode and these electrons are forced back to the dynode.

If a load (not shown) is inserted between the dynode and the cathode the corresponding load line LL intersects the characteristic curve CC at three points, designated D, US and U. The points D and U represent stable states of equilibrium referred to herein as the "down" and "up" conditions respectively and the point US represents an unstable state of equilibrium. If the actual dynode voltage value is found to the right of point US the dynode current will exceed the current through the load and the dynode voltage will automatically increase until the point U is reached and the circuit will there remain in stable equilibrium until this condition is disturbed from an external source. Also, if the actual dynode voltage value is to the left of the point US this voltage will automatically decrease until the point D is reached and the circuit will there remain in stable equilibrium until this condition is disturbed from an external source. When stable operation occurs at the point D the dynode voltage is down and when the stable operation occurs at the point U the dynode voltage is up. Hence, when the dynode voltage is down the trigger circuit is in the "down" condition. When the dynode voltage is up the trigger circuit is in the "up" condition.

Figure 2:
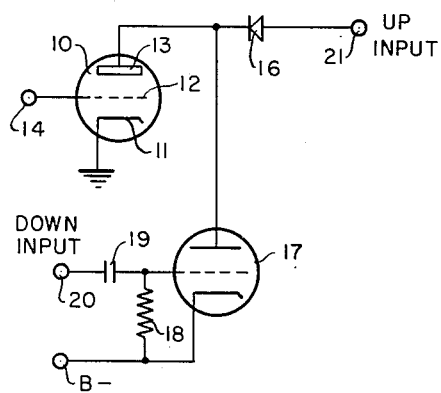
Fig. 2 shows one embodiment of the trigger circuit of the invention.

Referring to Fig. 2 a crystal diode 16 is used as a load for the dynode 13. A grid controlled tube 17 has its plate connected in parallel with the dynode. The cathode of the tube 17 is connected with a suitable source of negative voltage designated B— from which bias voltage is obtained for the control grid of the tube 17 through an appropriate resistor 18. This control grid is also connected through a coupling condenser 19 to a "down" input terminal 20. An "up" input terminal is connected to the diode 16.

Figure 2A:
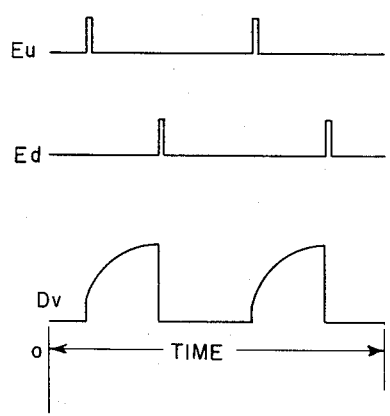
Fig. 2a shows performance curves for the trigger circuit shown in Fig. 2.

The operation of this circuit is clearly understood by reference to Figs. 2 and 2a. If a positive pulse represented by the curve Eu is applied to the "up" terminal 21 the dynode voltage is increased beyond the unstable condition and reaches a condition of stable equilibrium in the "up" condition as indicated by the increased dynode voltage shown by the curve Dv. If a positive pulse represented by the curve Ed is now applied to the "down" terminal 20 the tube 17 is rendered plate current conductive as a result of the positive voltage applied to its control grid. The resulting decreased voltage at the plate of the tube 17 causes a similar decreased voltage at the dynode 13 to which it is connected. This decreased voltage causes the dynode voltage to decrease below its voltage at the point US as shown in Fig. 1a and to adjust itself in stable equilibrium in the "down" condition. Subsequent input pulses to terminals 21 and 20 cause a repetition of this operation.

Figure 3:
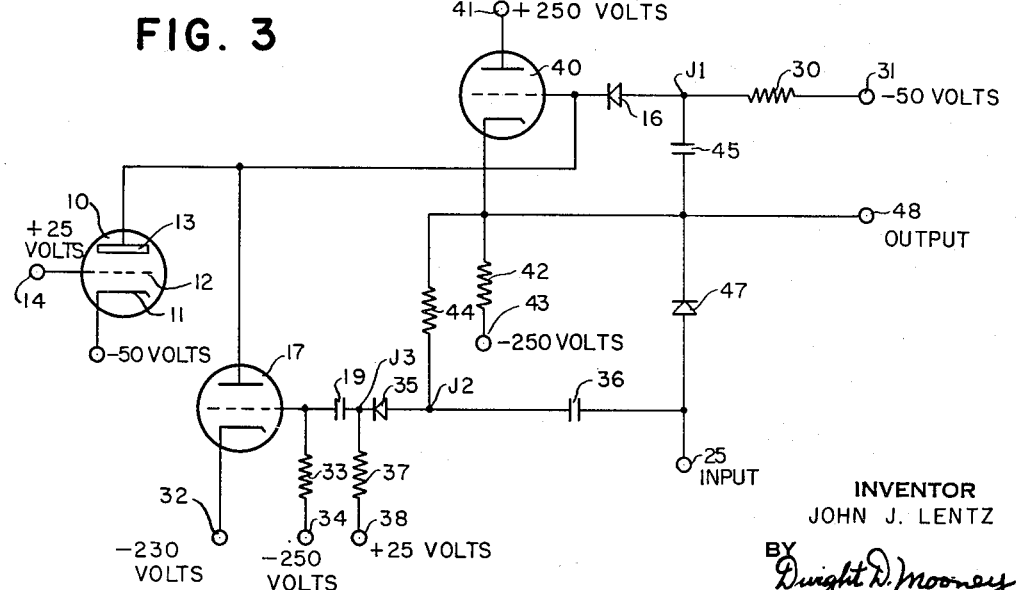
Fig. 3 is a circuit diagram of the embodiment of the trigger circuit of the invention.

Referring to Fig. 3 the trigger circuit is provided with a single input terminal 25 connected to a source of positive pulses (not shown) to effect a switching of the trigger circuit from either stable condition to the other. Solely for the purpose of clarity of explanation such is undertaken with reference to the particular voltage values and the performance curves of Fig. 3a.

The tube 10 has its dynode 13 connected through a crystal diode 16 and a resistor 30 to a —50 voltage terminal 31. The dynode is also connected to the plate of grid controlled tube 17 whose cathode is connected to a —230 volt terminal 32. The grid of the tube 17 is connected through a bias resistor 33 to a —250 volt terminal 34 and through condenser 19, crystal diode 35 and condenser 36 to the input terminal 25. The juncture J3 of condenser 19 and diode 35 is connected through bias resistor 37 to a +25 volt terminal 38. A grid controlled tube 40 operated as a cathode follower has its plate connected to a +250 volt terminal 41 and its cathode connected through resistor 42 to a —250 volt terminal 43 and through a resistor 44 to the juncture of diode 35 and condenser 36, which juncture is designated as J2. A condenser 45 is connected between the juncture of diode 16 and resistor 30, which juncture is designated as J1 and the cathode of the tube 40 which is also connected through crystal diode 47 to the input terminal 45 and to the output terminal 48.

Figure 3A:
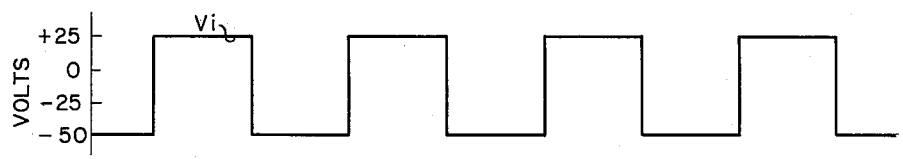
Fig. 3a shows performance curves illustrating the operation of the trigger circuit shown in Fig. 3.
Figure 3A:
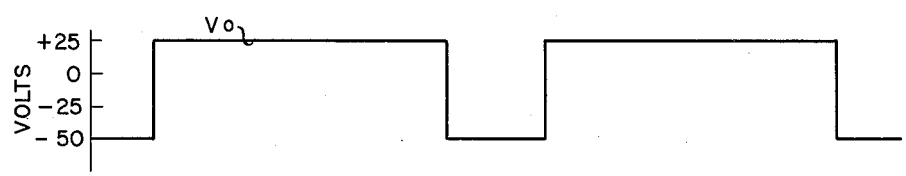
Figure 3A:
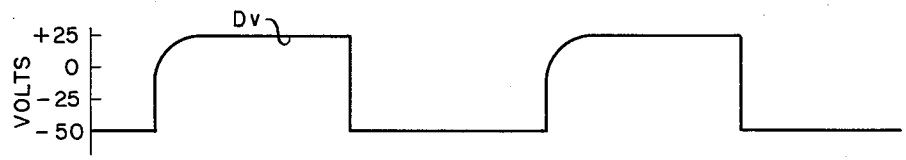
Figure 3A:
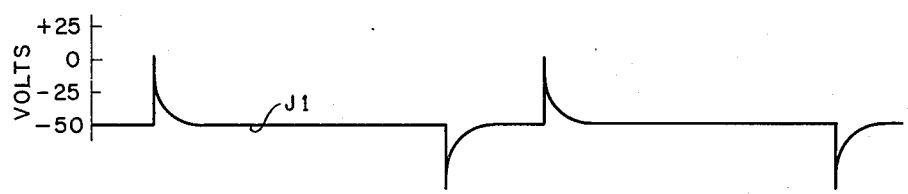
Figure 3A:
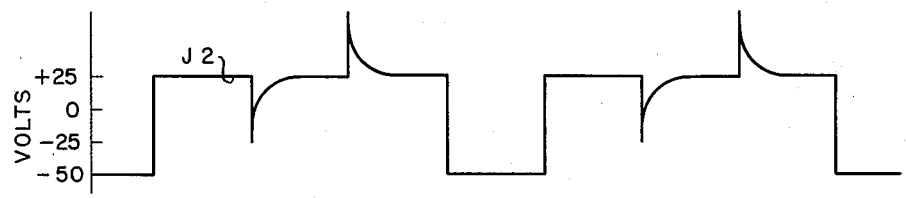
Figure 3A:
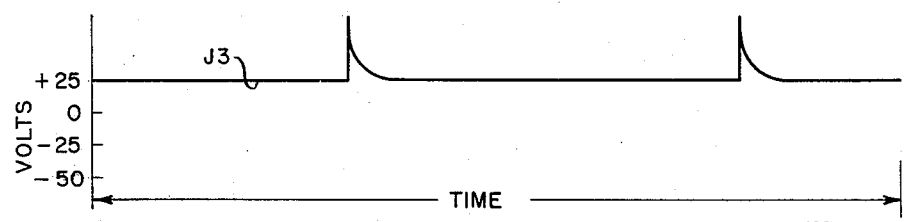

In Fig. 3a the curves Vi, Vo, Dv, J1, J2 and J3 respectively represent the voltage at the input terminal 25, output terminal 48, dynode 13, juncture J1, juncture J2 and juncture J3.

In order to fully explain the operation of the novel circuitry employed it is assumed that the trigger circuit is initially in the "down" condition, the tube 17 is cut off and the cathode follower tube 40 is less conductive. The condensers 36 and 45 are not charged, the dynode voltage Dv is at a value of —50 volts and the voltage at J3 is +25 volts.

The first input pulse Vi applied to the input terminal 25 increases the voltage at juncture J2 from —50 to +25 volts so that both sides of the crystal diode 35 are at the same voltage, hence no voltage change is applied to the control grid of the tube 17 and it remains non conductive.

This same pulse causes conduction through diode 47 and an increase of the voltage at the output terminal from —50 volts to +25 volts. This voltage change is transferred through the condenser 45 and appears as a pulse at J1. This pulse is applied through diode 16 to the dynode of the tube 10 and to the control grid of the cathode follower tube 40. This pulse causes the dynode voltage to be increased above its voltage corresponding to the point US of Fig. 1a as indicated by the curve Dv, Fig. 3a, and in accordance with the previous explanation herein the dynode voltage continues to increase and the cathode follower tube 40 is rendered more conductive.

When the input pulse Vi ceases the output voltage Vo tends to fall or decrease but is prevented from doing so by the cathode follower tube 40. This is accomplished because the cathode of the cathode follower tube 40 is connected to the juncture of the condenser 45 and diode 47 as is the output terminal 48. Hence the high voltage at the cathode of the cathode follower tube 40 caused by its high conductivity is also present at the output terminal 48. The trigger circuit is now in the "up" condition and remains there until disturbed by external means.

The condenser 45 is now charged with its top plate minus and its bottom plate plus and the condenser 36 is charged with its right hand plate minus (—50 volts, the voltage at the input terminal 25) and its left hand plate positive.

The next pulse Vi does not cause conduction through diode 47. The voltage difference across its terminals is insufficient to cause conduction because of the high conductivity of the cathode follower tube 40. However, this pulse is transferred through condenser 36 and applies the positive pulse shown by curve J2 to the diode 35 to render it conductive thereby producing the positive pulse shown by curve J3. This positive pulse renders the tube 17 conductive. The decreased voltage at the anode of the tube 17 pulls down or decreases the voltage on the dynode 13 to which it is connected to a value below the voltage value corresponding to the point US of Fig. 1a. The trigger circuit therefore switches to the "down" condition and the cathode follower tube 40 conducts only slightly to produce a decreased voltage at the output terminal 48 as indicated by the curve Vo and a decreased voltage at the juncture J2 as indicated by the curve J2. When the input voltage ceases the tube 17 returns to its non conductive or cut-off condition. The circuit is now in its initial starting condition as prior to the application of the first input pulse. Subsequent input pulses cause a repetition of the operation set forth. Hence, each two input pulses cause an increase and a decrease in the output voltage.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a trigger circuit a secondary emission tube having at least a cathode, collector, and dynode for exhibiting two stable conditions represented respectively by high and low voltage at the dynode; a source of input pulses for switching the trigger circuit from either stable condition to the other; connections including first and second electrical paths between said secondary emission tube and said source of pulses; and circuit means including voltage responsive components in each of said paths; and voltage transferring means connecting said paths for rendering said paths alternately conductive in response to a pulse from said source to thereby switch said trigger circuit from either stable condition to the other.

2. The trigger circuit set forth in claim 1 wherein said circuit means includes a cathode follower tube having its control grid connected in said first path and to said dynode and its cathode connected directly in said first path, through a resistive connection into said second path and to an output terminal whereby said output terminal is held at a voltage dependent upon the conduction of said cathode follower.

3. The trigger circuit set forth in claim 2 wherein said second path includes a grid controlled tube having its plate connected to said dynode, a crystal diode and a capacitor connected in series between the grid controlled tube and said input terminal, said diode and capacitor being connected to said resistive connection whereby the voltage at the cathode of said cathode follower determines the voltage at one terminal of said diode and thereby determines the response of said diode to pulses from said source.

4. The trigger circuit set forth in claim 1 wherein the second of said paths includes a grid controlled tube having its plate connected to said dynode, a crystal diode and a capacitor connected in series between the control grid of said grid controlled tube and said input terminal, and a connection from said voltage transferring means to the juncture of said diode and capacitor to vary the voltage at one terminal of the diode in accordance with the voltage transfer from said first path to control the conductivity of said grid controlled tube.

5. A trigger circuit having two stable conditions including a secondary emission tube having at least a cathode, collector, and dynode; a connection to a single input terminal and a source of pulses connected to supply pulses thereto; first and second electrical paths alternately effective and connected between said input terminal and said secondary emission tube to apply voltage changes thereto in response to each of said pulses to change the stable condition of said trigger circuit; and means connected to be responsive to the stable condition of said trigger circuit to render said first path effective and said second path ineffective and vice versa.

6. In a trigger circuit having two stable conditions and a secondary emission tube having at least a cathode, collector, and dynode connected to a single input terminal and a source of pulses connected to supply pulses thereto, a low voltage being present at the dynode when the trigger circuit is in one stable condition and high voltage being present at the dynode when it is in its other stable condition; a grid controlled cathode follower tube having its control grid connected to said dynode so that it is slightly conductive when the voltage of the dynode is low and highly conductive when the voltage of the dynode is high; a first electrical path from said input terminal to the control grid of said cathode follower, said path including a crystal diode having one terminal connected to said control grid and the other terminal connected to a source of steady voltage so that a pulse from said input terminal is transferred through said diode only when said cathode follower is slightly conductive; a grid controlled tube having its plate connected to said dynode to pull down the value of the voltage at the dynode to that at the plate when said grid controlled tube is plate current conductive; and means connected between said grid controlled tube and said input terminal to render said grid controlled tube plate current conductive in response to a pulse from said source only when said dynode voltage is high.

7. The trigger circuit set forth in claim 6 wherein said means includes a crystal diode having one of its terminals connected to the control grid of said grid controlled tube and its other terminal connected to a capacitor which is also connected to said input terminal, and a resistive connection from the cathode of said cathode follower tube to said other terminal of said crystal diode to effect voltage transfer to the latter.

8. An electronic switch including a grid controlled secondary emission tube having a cathode, collector and dynode and "up" and "down" stable conditions indicated respectively by high and low voltages at the dynode; voltage means connected to supply steady operating voltages to said secondary emission tube; an input terminal connected to a source of positive pulses; a grid controlled tube connected to operate as a cathode follower; selective pulse transferring means connecting said terminal to said cathode follower and secondary emission tube to switch said electronic switch from only the "down" condition to the "up" condition in response to a pulse applied to said terminal, and including, a first and a second unidirectional current device connected to said grid controlled tube and said input terminal respectively and connected together through a capacitor having one of its plates connected to said output terminal and said cathode follower and its other plate connected to a source of steady voltage whereby said capacitor is discharged when said switch is in the "down" condition to permit an input pulse from said input terminal to render said cathode follower highly conductive and increase the voltage at said dynode to place the switch in the "up" condition; the connection between said cathode follower and said selective pulse transferring means to said ouput terminal for transferring a steady voltage to said output terminal to prevent a voltage change thereat when said input pulse is terminated; and an output terminal connected to said selective pulse transferring means and said cathode follower.

9. An electronic switch including a grid controlled secondary emission tube having a cathode, collector and dynode and "up" and "down" stable conditions indicated respectively by high and low voltages at the dynode; voltage means connected to supply steady operating voltages to said secondary emission tube; an input terminal connected to a source of positive pulses; a first grid controlled tube connected to operate as a cathode follower; selective pulse transferring means connecting said terminal to said cathode follower and secondary emission tube to switch said electronic switch from only the "down" condition to the "up" condition in response to a pulse applied to said terminal; an output terminal connected to said selective pulse transferring means and said cathode follower; a second grid controlled tube having its plate connected to said dynode; pulse transferring means connecting said input terminal to said second grid controlled tube; and a resistive connection between said cathode follower and said last-mentioned pulse transferring means to effect a voltage transfer between the former and the latter to control the application of pulses from said input terminal to said second grid controlled tube, so that said second grid controlled tube is rendered plate conductive to switch the electronic switch only from the "up" to the "down" condition.

10. The electronic switch set forth in claim 9 wherein said pulse transferring means includes a second capacitor connected between said input terminal and said resistive connection and a second unidirectional current device coupling said second capacitor and resistive connection to said second grid controlled tube whereby the voltage transferred from said cathode follower prevents an input pulse from rendering said second grid controlled tube plate current conductive when said electronic switch is in the "down" condition and permits an input pulse to render said second grid controlled tube plate current conductive when said electronic switch is in the "up" condition to pull the dynode voltage down to switch the switch to the "down" condition.

References Cited in the file of this patent
UNITED STATES PATENTS

| | | |
|---|---|---|
| 2,293,177 | Skellett | Aug. 18, 1942 |
| 2,428,819 | Skellett | Oct. 14, 1947 |
| 2,509,998 | Van der Mark et al. | May 30, 1950 |
| 2,631,233 | Steinberg | Mar. 10, 1953 |